United States Patent
Jung et al.

(10) Patent No.: US 8,863,123 B2
(45) Date of Patent: Oct. 14, 2014

(54) APPARATUS AND METHOD FOR VIRTUALIZING INPUT/OUTPUT DEVICES USING SHARED MEMORY IN HOST-BASED MOBILE TERMINAL VIRTUALIZATION ENVIRONMENT

(75) Inventors: Young-Woo Jung, Seoul (KR); Soo-Cheol Oh, Daejeon (KR); Chang-Won Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 202 days.

(21) Appl. No.: 13/480,009

(22) Filed: May 24, 2012

(65) Prior Publication Data

US 2013/0160005 A1  Jun. 20, 2013

(30) Foreign Application Priority Data

Dec. 15, 2011  (KR) .......................... 10-2011-0135875

(51) Int. Cl.
G06F 9/455 (2006.01)
G06F 12/00 (2006.01)
G06F 13/00 (2006.01)
G06F 13/28 (2006.01)

(52) U.S. Cl.
USPC ............................................. 718/1; 711/147

(58) Field of Classification Search
None
See application file for complete search history.

(56) References Cited

U.S. PATENT DOCUMENTS

| | | | |
|---|---|---|---|
| 2007/0300223 A1* | 12/2007 | Liu ..................................... | 718/1 |
| 2008/0104591 A1* | 5/2008 | McCrory et al. ................... | 718/1 |
| 2008/0235474 A1* | 9/2008 | Hwang et al. ................. | 711/163 |
| 2009/0055693 A1* | 2/2009 | Budko et al. ..................... | 714/57 |
| 2009/0113423 A1* | 4/2009 | Hiltgen et al. ..................... | 718/1 |
| 2009/0113425 A1* | 4/2009 | Ports et al. ......................... | 718/1 |
| 2009/0144510 A1* | 6/2009 | Wibling et al. ............... | 711/147 |
| 2009/0300613 A1* | 12/2009 | Doi .................................... | 718/1 |
| 2010/0333088 A1* | 12/2010 | Rogel et al. ....................... | 718/1 |
| 2011/0078361 A1* | 3/2011 | Chen et al. ......................... | 711/6 |
| 2011/0202706 A1  | 8/2011 | Moon et al. | |
| 2011/0296411 A1* | 12/2011 | Tang et al. ......................... | 718/1 |
| 2012/0304171 A1* | 11/2012 | Joshi et al. ......................... | 718/1 |
| 2013/0145073 A1* | 6/2013 | Tuch et al. ......................... | 711/6 |

FOREIGN PATENT DOCUMENTS

KR  10-2011-0095051  8/2011

* cited by examiner

*Primary Examiner* — Charles Swift
(74) *Attorney, Agent, or Firm* — Staas & Halsey LLP

(57) ABSTRACT

Disclosed herein are an apparatus and method for virtualizing Input/Output (I/O) devices. The apparatus includes a hardware device control unit, a guest Operating System (OS) unit, a virtual machine monitor unit, and a host OS unit. The hardware device control unit controls the I/O devices of a terminal. The guest OS unit runs a guest OS via a virtual machine. The virtual machine monitor unit includes shared memory and an event channel, stores an instruction and data, and transfers the stored instruction and the data to a host OS. The host OS unit performs the operation of assigning the shared memory to the virtual machine monitor unit, the operation of generating the event channel, and an operation corresponding to the I/O instruction, stores the results of performance of the operations, and performs control so that the results of the performance of the operations are sent to the guest OS unit.

9 Claims, 4 Drawing Sheets

APPARATUS AND METHOD FOR VIRTUALIZING INPUT/OUTPUT DEVICES USING SHARED MEMORY IN HOST-BASED MOBILE TERMINAL VIRTUALIZATION ENVIRONMENT

CROSS REFERENCE TO RELATED APPLICATION

This application claims the benefit of Korean Patent Application No. 10-2011-0135875, filed on Dec. 15, 2011, which is hereby incorporated by reference in its entirety into this application.

BACKGROUND OF THE INVENTION

1. Technical Field

The present invention relates generally to technology for virtualizing various Input/Output (I/O) devices using shared memory in a host-based mobile terminal virtualization environment where a plurality of Operating Systems (OSs) is concurrently run on a mobile terminal.

2. Description of the Related Art

Currently, various devices for the I/O of video, audio, a disk, a network, etc. are being used in mobile terminals. When host-based mobile terminal virtualization technology is used in order to concurrently run multiple OSs in this environment, a host Operating System (OS) has the right of control over all hardware resources and a guest OS is run as a virtual machine within the host OS.

In this case, in order for the guest OS to run normally, the guest OS must be able to control all I/O device resources for video, audio, a disk, a network, etc.

If the host OS and the guest OS control the same I/O device at the same time, a data corruption problem occurs.

In order to solve this problem, the guest OS must use the I/O devices via the host OS, using virtual device drivers for the respective I/O devices. However, there is a problem in that all I/O devices must be virtualized, because various I/O devices which are controlled by difference methods are used in mobile terminals.

SUMMARY OF THE INVENTION

Accordingly, the present invention has been made keeping in mind the above problems occurring in the prior art, and an object of the present invention is to provide an apparatus and method for easily virtualizing various I/O devices using shared memory assigned by a host OS in a host-based mobile terminal virtualization environment.

In order to accomplish the above object, the present invention provides an apparatus for virtualizing I/O devices, including a hardware device control unit configured to control I/O devices of a terminal; a guest OS unit configured to run a guest OS for running an application program via a virtual machine; a virtual machine monitor unit configured to include shared memory for transferring I/O data and an event channel for transferring events between OSs, to store an instruction and data, corresponding to an I/O request signal, in the shared memory when the I/O request signal is received from the guest OS unit, and to transfer the stored instruction and the data to a host OS via the event channel; and a host OS unit configured to perform an operation of assigning the shared memory to the virtual machine monitor unit, an operation of generating the event channel, and an operation corresponding to the I/O instruction via the hardware device control unit when the I/O instruction is received via the event channel, to store results of performance of the operations in the shared memory, and to perform control so that the results of the performance of the operations are sent to the guest OS unit via the event channel.

In order to accomplish the above object, the present invention provides a method of virtualizing I/O devices, including sending, by a guest OS configured to run in a virtual machine, an I/O request signal to a virtual machine monitor, including shared memory for transferring specific I/O data and an event channel for transferring events between OSs, via the event channel; storing, by the virtual machine monitor, an instruction and data, corresponding to the received I/O request signal, in the shared memory when the I/O request signal is received, and transferring, by the virtual machine monitor, the stored instruction and data to a host OS via the event channel; performing, by the host OS, an operation corresponding to the received I/O instruction by controlling a hardware device when the I/O instruction is received via the event channel; and storing, by the host OS, the results of the performance of the operation in the shared memory, and sending, by the virtual machine monitor, the stored result to the guest OS.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
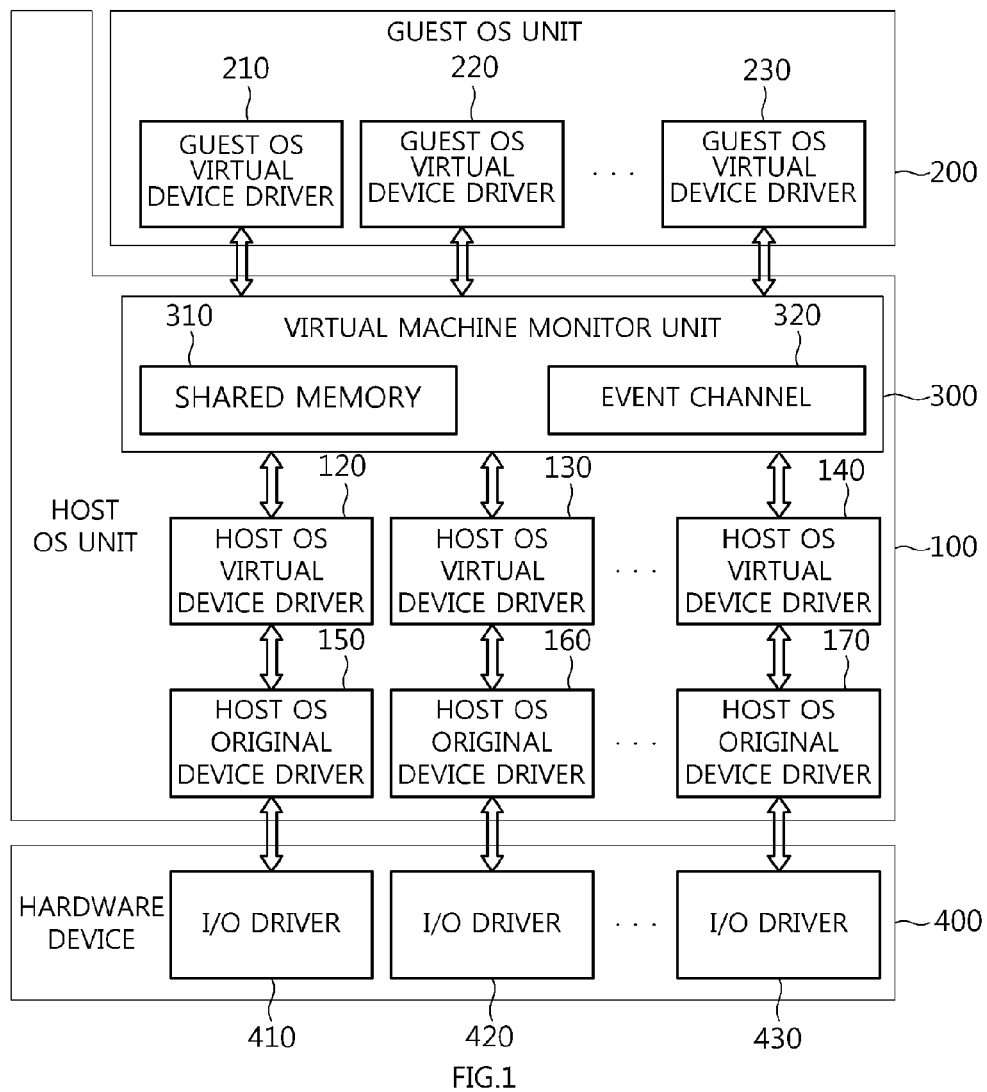
FIG. 1 is a diagram showing a virtual machine monitor according to an embodiment of the present invention.

Reference now should be made to the drawings, throughout which the same reference numerals are used to designate the same or similar components.

FIG. 1 is a diagram showing a virtual machine monitor according to an embodiment of the present invention.

A system for virtualizing I/O devices in a host-based mobile terminal virtualization environment may include a hardware device control unit 400 configured to include the I/O devices of a terminal, a host OS unit 100 configured to have the right of control over all hardware devices and provide the operating environment of the guest OS unit 200, a virtual machine monitor unit 300 configured to run a guest OS by supporting the virtualization of a CPU, memory and I/O and isolate the execution environment of each OS from other environments, and a guest OS unit 200 configured to be run by the support of the virtual machine monitor unit 300 and drive the guest OS for running an application program via a virtual machine.

Accordingly, in order for the guest OS to use I/O devices in a virtualized environment, in the guest OS, guest OS virtual device drivers 210, 220, and 230 are used. In a host OS, host OS virtual device drivers 120, 130, 140 corresponding to the respective virtual device drivers 210, 220, and 230 of the guest OS may receive I/O device requests made by the guest OS, transfer the I/O device requests to original device drivers 150, 160, and 170, and then transfer the results of the I/O device requests to the virtual device drivers of the guest OS.

The virtual machine monitor unit 300 may include shared memory 310 assigned by the host OS to support the transfer of the data and events of two virtual device drivers and an event channel 320 configured to transfer events between OSs.

Furthermore, the virtual machine monitor unit 300 may store an instruction and data, corresponding to an I/O request signal, in the shared memory 310 when the I/O request signal is received from the guest OS unit 200, transfer the stored instruction and data to the host OS via the event channel 320, and send the results of the performance of the operation of the stored instruction to the guest OS unit 200 via the event channel 320 when the results of the performance of the operation is stored in the shared memory 310 via the host OS unit 100.

Furthermore, the host OS unit 100 may perform the operation of assigning the shared memory 310 to the virtual machine monitor unit 300 and the operation of generating the event channel 320. When an I/O instruction is received via the event channel 320, the host OS unit 100 may perform an operation, corresponding to the received I/O instruction, via the hardware device control unit 400 and store the results of the performance of the operation in the shared memory 310 so that the results of the performance of the operation are transmitted to the guest OS unit 200 via the event channel 320.

Furthermore, if an I/O instruction received via the event channel 320 is a data write instruction, the host OS unit 100 may perform the operation of writing input data, stored in the shared memory 310, to a physical device via the hardware device control unit 400 in response to the data write instruction. If an I/O instruction received via the event channel 320 is a data read instruction, the host OS unit 100 may perform the operation of reading data stored in a physical device and store the read data in the shared memory 310 via the hardware device control unit 400 in response to the data read instruction.

Furthermore, when a specific I/O instruction is received, the host OS unit 100 may determine whether the I/O instruction has been received from the guest OS unit 200 via the event channel 320. If, as a result of the determination, it is determined that the I/O instruction has not been received from the guest OS, the host OS unit 100 may not access the virtual machine monitor unit 300, but may perform an operation corresponding to the I/O instruction via only the hardware device control unit 400. That is, if the I/O instruction has not been received from the guest OS, the host OS unit 100 operates like a common I/O device.

Furthermore, the guest OS unit 200 may send an I/O request signal to the virtual machine monitor unit 300 via the event channel 320 using the guest OS virtual device driver including one or more guest OS virtual device drivers. In an embodiment, the guest OS unit 200 may use a different guest OS virtual device driver depending on the type of data that may be input to and output from the guest OS.

Furthermore, the host OS unit 100 may perform an operation corresponding to the received I/O instruction using the host OS virtual device driver including one or more host OS virtual device drivers. In an embodiment, the host OS unit 100 may use a different host OS virtual device driver depending on the type of data that may be input and output via the hardware device control unit 400.

Figure 2:
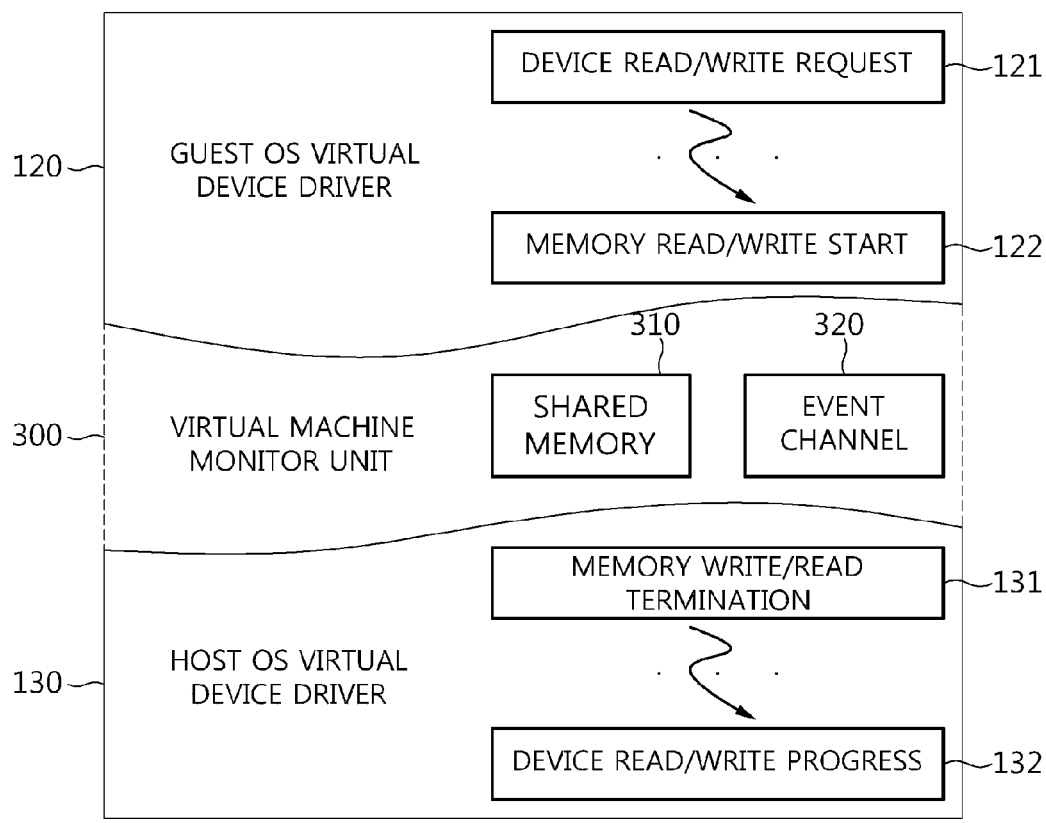
FIG. 2 is a diagram showing the construction of a driver in which an I/O operation is performed via a virtual machine according to an embodiment of the present invention.

FIG. 2 is a diagram showing the construction of a driver in which an I/O operation is performed via a virtual machine according to an embodiment of the present invention.

In accordance with the embodiment, in order to generate virtual device drivers by maximally reusing original device drivers, the upper part of an original device driver above a memory write/read start part 122 may be used as the virtual device driver 120 of the guest OS, and the part of the lower part of the original device driver including a device read/write progress part 132 below a memory write/read termination part 131 may be used as the virtual device driver 130 of the host OS.

Accordingly, if the parts of two virtual device drivers where a request is written to memory and the results of the writing are processed are replaced with a method using the shared memory 310 and event channel 320 of the virtual machine monitor 300, the two virtual device drivers can be easily generated.

That is, in order to generate virtual device drivers used in the host and guest OSs, the existing device drivers are reused. The virtual device driver of the guest OS reuses the part of the existing device driver before a part where data is written or read to or from a physical device, and the virtual device driver of the host OS reuses the part where transferred data is written to or read from the physical device.

Accordingly, in order to read and write data from and to a physical device, division into the virtual device driver of the guest OS and the virtual device driver of the host OS is performed around a part where data is written to or read from memory within the OS, and the part where data is written to or read from the memory is replaced with the shared memory 310 and the event channel 320.

As a result, the virtual device drivers used by the guest OS and the host OS are generated reusing the existing device drivers as described above, and therefore an effort to generate virtual device drivers for physical devices can be minimized. Furthermore, a method for virtualizing an I/O device is made universally applicable to all I/O devices using the shared memory 310 and the event channel 320, and therefore various physical I/O devices can be easily virtualized.

Figure 3:
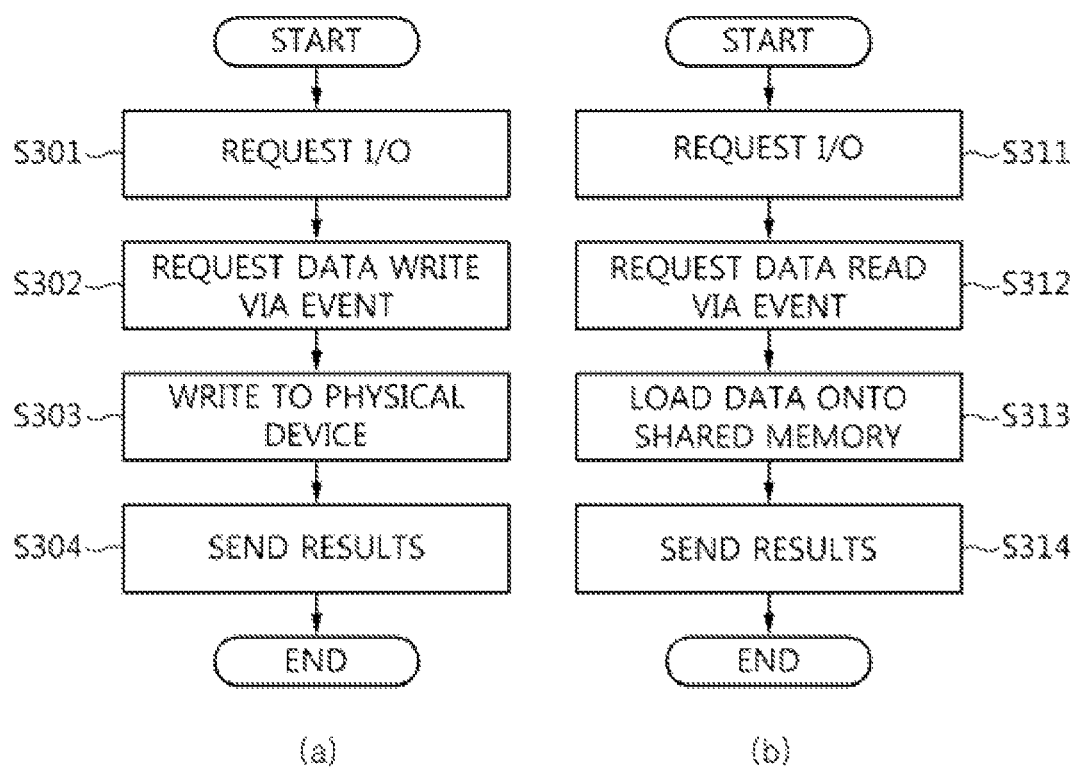
FIG. 3 is a flowchart illustrating a process in which an I/O operation is performed via a virtual machine according to an embodiment of the present invention.

FIG. 3 is a flowchart illustrating a process in which an I/O operation is performed via a virtual machine according to an embodiment of the present invention.

In accordance with the embodiment, a data write operation may be performed via a virtual I/O device, as shown in FIG. 3A.

First, a guest OS for running an application program via a virtual machine sends an I/O request signal to the virtual machine monitor 300, including the shared memory 310 for transferring specific I/O data and the event channel 320 for transferring events between OSs, via the event channel 320 at step S301.

Thereafter, when the I/O request signal is received, the virtual machine monitor 300 stores an instruction and data, corresponding to the received I/O request signal, in the shared memory 310 and transfers the stored instruction and data to the host OS via the event channel 320 at step S302.

In an embodiment, a guest OS including one or more guest OS virtual device drivers may send an I/O request signal using a guest OS virtual device driver, and may send the I/O request signal using a different guest OS virtual device driver depending on the type of data that may be input to and output from the guest OS.

Thereafter, when the I/O instruction is received via the event channel 320, the host OS performs an operation corresponding to the received I/O instruction by controlling a hardware device.

That is, the host OS may perform the operation of writing the input data, stored in the shared memory 310, to a physical device by controlling the hardware device in response to a data write instruction at step S303.

Furthermore, the host OS unit 100 may perform an operation corresponding to the received I/O instruction using the host OS virtual device drivers including one or more host OS virtual device drivers. In an embodiment, the host OS unit 100 may perform the operation using a different host OS virtual device driver depending on the type of data that may be input and output via the hardware device control unit 400.

Thereafter, the host OS may store the results of the performance of the operation in the shared memory 310, and the virtual machine monitor 300 may send the results of the storage to the guest OS at step S304, thereby completing the data write operation.

According to another embodiment, a data read operation may be performed via a virtual I/O device, as shown in FIG. 3B.

If the data read operation is performed, step S301 of sending an I/O request and step S312 of requesting to read data via an event are the same as steps S301 and S302 of FIG. 3A, and thus descriptions thereof are omitted here.

Thereafter, when the I/O instruction is received via the event channel 320, the host OS performs an operation corresponding to the received I/O instruction by controlling the hardware device.

That is, the host OS may perform the operation of reading data stored in a physical device and storing the read data in the shared memory 310 by controlling the hardware device in response to the data read instruction at step S313.

Thereafter, the host OS may store the results of the performance of the operation in the shared memory 310, and the virtual machine monitor 300 sends the stored results to the guest OS at step S314, thereby terminating the data read operation.

Figure 4:
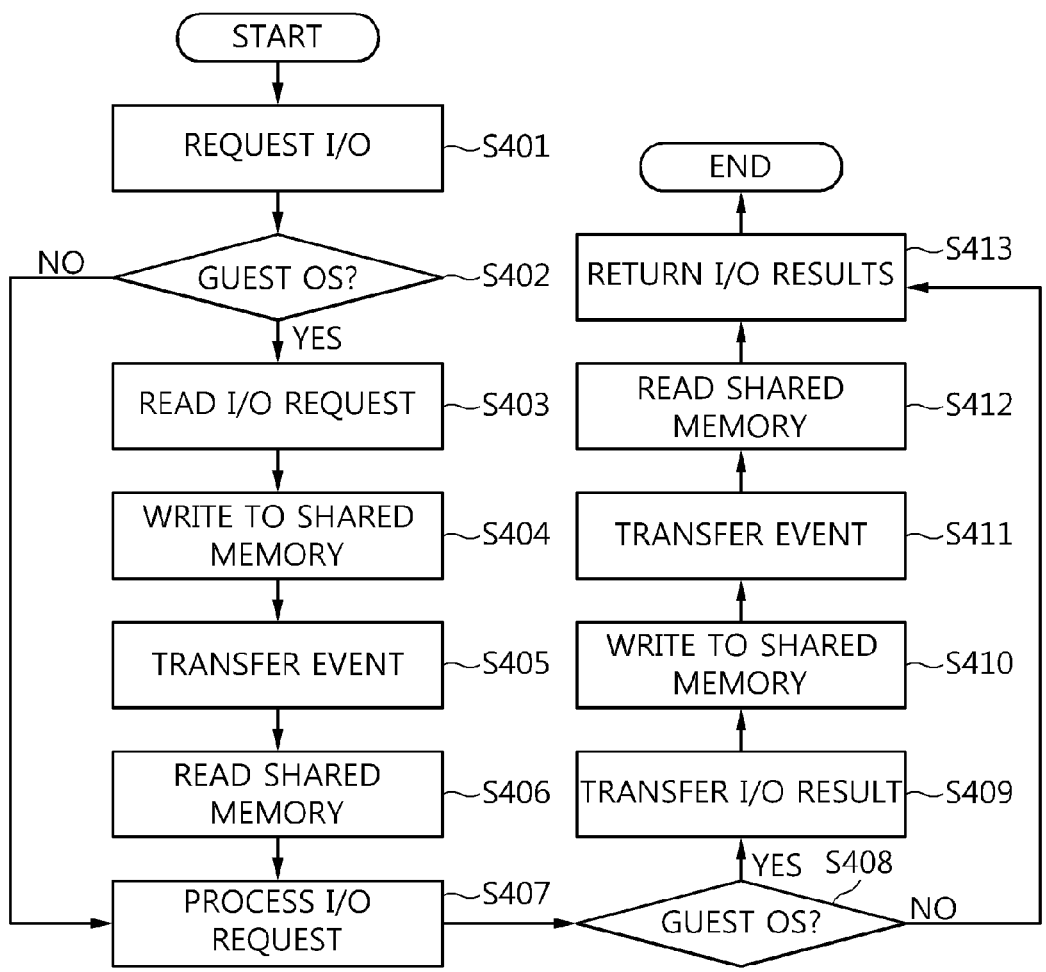
FIG. 4 is a flowchart illustrating a process in which an I/O operation is performed via the virtual machine according to another embodiment of the present invention.

FIG. 4 is a flowchart illustrating a process in an I/O operation is performed via a virtual machine according to another embodiment of the present invention.

In accordance with the embodiment, when an I/O request related to an I/O device is received at step S401, whether the I/O request has been made by the guest OS is determined at step S402.

If, as a result of the determination at step S402, it is determined that the I/O request has been made by the host OS other than the guest OS, the I/O request is processed using the original device driver at step S407.

That is, the operation is performed in the same way as that of a common I/O device.

In contrast, if, as a result of the determination at step S402, it is determined that the I/O request has been made by the guest OS, the I/O request is read at step S403 and then stored in the shared memory 310 at step S404. An event is transferred to the virtual device driver of the host OS at step S405.

Thereafter, a host OS virtual device driver reads the I/O request from the shared memory 310, transfers the read I/O request to an original device driver at step S406, and then processes the request at step S407.

Furthermore, whether a destination to which the results of the processing will be transferred is the host OS is determined at step S408. If, as a result of the determination at step S408, it is determined that the destination to which the results of the processing will be transferred is the host OS, the host OS virtual device driver immediately returns the results of the processing to the host OS at step S413.

If, as a result of the determination at step S408, it is determined that the destination to which the results of the processing will be transferred is the host OS, the host OS virtual device driver receives the results of the I/O request at step S409, writes the results to the shared memory 310 at step S410, and transfers an event to a guest OS virtual device driver at step S411.

Thereafter, the guest OS virtual device driver reads the results from the shared memory 310 at step S412, and then returns the results to the host OS at step S413.

As described above, in accordance with the present invention, in order to virtualize I/O devices using shared memory in a host-based mobile terminal virtualization environment, virtual device drivers to be used by a guest OS and a host OS are generated maximally using original device drivers, and an I/O request is processed using shared memory and the event channel of the virtual machine monitor. Accordingly, a method of easily virtualizing various I/O devices can be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for virtualizing Input/Output (I/O) devices, comprising:

a hardware device control unit configured to control I/O devices of a computer terminal;

a guest Operating System (OS) unit configured to run a guest OS for running an application program via a virtual machine;

a virtual machine monitor unit configured to include shared memory for transferring I/O data and an event channel for transferring events between the quest OS and a host OS, to store an instruction and data, corresponding to an I/O request signal, in the shared memory when the I/O request signal is received from the guest OS unit, and to transfer the stored instruction and the data to the host OS via the event channel; and a host OS unit configured to perform an operation of assigning the shared memory to the virtual machine monitor unit, an operation of generating the event channel, and an operation corresponding to the I/O instruction via the hardware device control unit when the I/O instruction is received via the event channel, to store results of performance of the operations in the shared memory, and to perform control so that the results of the performance of the operations are sent to the guest OS unit via the event channel, wherein the guest OS unit includes one or more guest OS virtual device drivers and sends the I/O request signal to the virtual machine monitor unit via the event channel using the guest OS virtual device drivers, and wherein the host OS unit includes one or more host OS virtual device drivers and performs the operation corresponding to the received I/O instruction using the host OS virtual device drivers.

2. The apparatus as set forth in claim 1, wherein:

the guest OS unit uses a different guest OS virtual device driver depending on a type of data that is able to be input to and output from the guest OS; and the host OS unit uses a different host OS virtual device driver depending on a type of data that is able to be input and output via the hardware device control unit.

3. The apparatus as set forth in claim 1, wherein if the I/O instruction received via the event channel is a data write instruction, the host OS unit performs an operation of writing the data, stored in the shared memory, to a physical device via the hardware device control unit in response to the data write instruction.

4. The apparatus as set forth in claim 1, wherein if the I/O instruction received via the event channel is a data read instruction, the host OS unit performs an operation of reading data stored in a physical device and storing the read data in the shared memory via the hardware device control unit in response to the data read instruction.

5. The apparatus as set forth in claim 1, wherein once the results of the performance of the operation are stored in the shared memory, the virtual machine monitor unit sends the results of the performance of the operation to the guest OS unit via the event channel.

6. A method of virtualizing I/O devices, comprising:
sending, by a guest OS configured to run in a virtual machine, an I/O request signal to a virtual machine monitor, including shared memory for transferring specific I/O data and an event channel for transferring events between the guest OS and a host OS, via the event channel;
storing, by the virtual machine monitor, an instruction and data, corresponding to the received I/O request signal, in the shared memory when the I/O request signal is received, and transferring, by the virtual machine monitor, the stored instruction and data to the host OS via the event channel;
performing, by the host OS, an operation corresponding to the received I/O instruction by controlling a hardware device when the I/O instruction is received via the event channel; and
storing, by the host OS, the results of the performance of the operation in the shared memory, and sending, by the virtual machine monitor, the stored result to the guest OS,
wherein the sending the I/O request signal comprises sending, by the guest OS including one or more guest OS virtual device drivers, the I/O request signal using the guest OS virtual device drivers, and
wherein the performing the operation corresponding to the received I/O instruction comprises performing, by the host OS including one or more host OS virtual device drivers, control of a hardware device corresponding to the received I/O instruction using the host OS virtual device drivers.

7. The method as set forth in claim 6, wherein:
the sending the I/O request signal comprises sending the I/O request signal using a different guest OS virtual device driver depending on a type of data that is able to be input to and output from the guest OS, and
the performing the operation corresponding to the received I/O instruction comprises performing the control of the hardware device corresponding to the received I/O instruction using a different host OS virtual device driver depending on a type of data that is able to be input and output via the hardware device.

8. The method as set forth in claim 6, wherein the performing the operation corresponding to the received I/O instruction comprises performing the operation of writing the data, stored in the shared memory, to a physical device by controlling the hardware device in response to a data write instruction if the I/O instruction received via the event channel is the data write instruction.

9. The method as set forth in claim 6, wherein the performing the operation corresponding to the received I/O instruction comprises reading data stored in a physical device and storing the read data in the shared memory by controlling the hardware device in response to a data read instruction if the I/O instruction received via the event channel is the data read instruction.

* * * * *